United States Patent [19]
Northrup et al.

[11] 3,873,823
[45] Mar. 25, 1975

[54] ALIGNMENT INDICATING BEACON

[75] Inventors: Richard M. Northrup, Nashua; Philip M. Johnson, Windham, both of N.H.

[73] Assignee: Sanders Associates, Inc., Nashua, N.H.

[22] Filed: Aug. 6, 1973

[21] Appl. No.: 385,762

Related U.S. Application Data

[63] Continuation of Ser. No. 312,537, Dec. 6, 1972, abandoned.

[52] U.S. Cl................ 240/52 R, 33/286, 240/1 R, 240/23, 356/138
[51] Int. Cl.............................................. F21v 21/00
[58] Field of Search............ 240/52 R, 1.2, 7.5, 22, 240/23, 1 R; 356/138; 33/286; 250/199

[56] References Cited
UNITED STATES PATENTS

| | | | |
|---|---|---|---|
| 2,386,268 | 10/1945 | Roper | 240/1.2 |
| 2,822,615 | 2/1958 | Durst et al. | 356/138 |
| 3,138,779 | 6/1964 | Murry et al. | 240/1.2 |
| 3,254,206 | 5/1966 | Martelet | 240/7.5 |

*Primary Examiner*—Richard L. Moses
*Attorney, Agent, or Firm*—Louis Etlinger

[57] ABSTRACT

A beacon is described which can be quickly and easily mounted upon or demounted from the telescope of a surveyor's transit. It projects a pattern of energy into a region of space in such a way as to divide the region into two or more sharply delineated portions which are distinguished by the different, readily recognizable characteristics of the energy projected into each. A typical example is the projection of red light into one half of the region and green light into the other half with their junction aligned with the vertical cross hair of the telescope. By this arrangement one need only observe the color of the light he is receiving in order to determine whether he is to one or the other side of the optical axis of the telescope.

17 Claims, 5 Drawing Figures

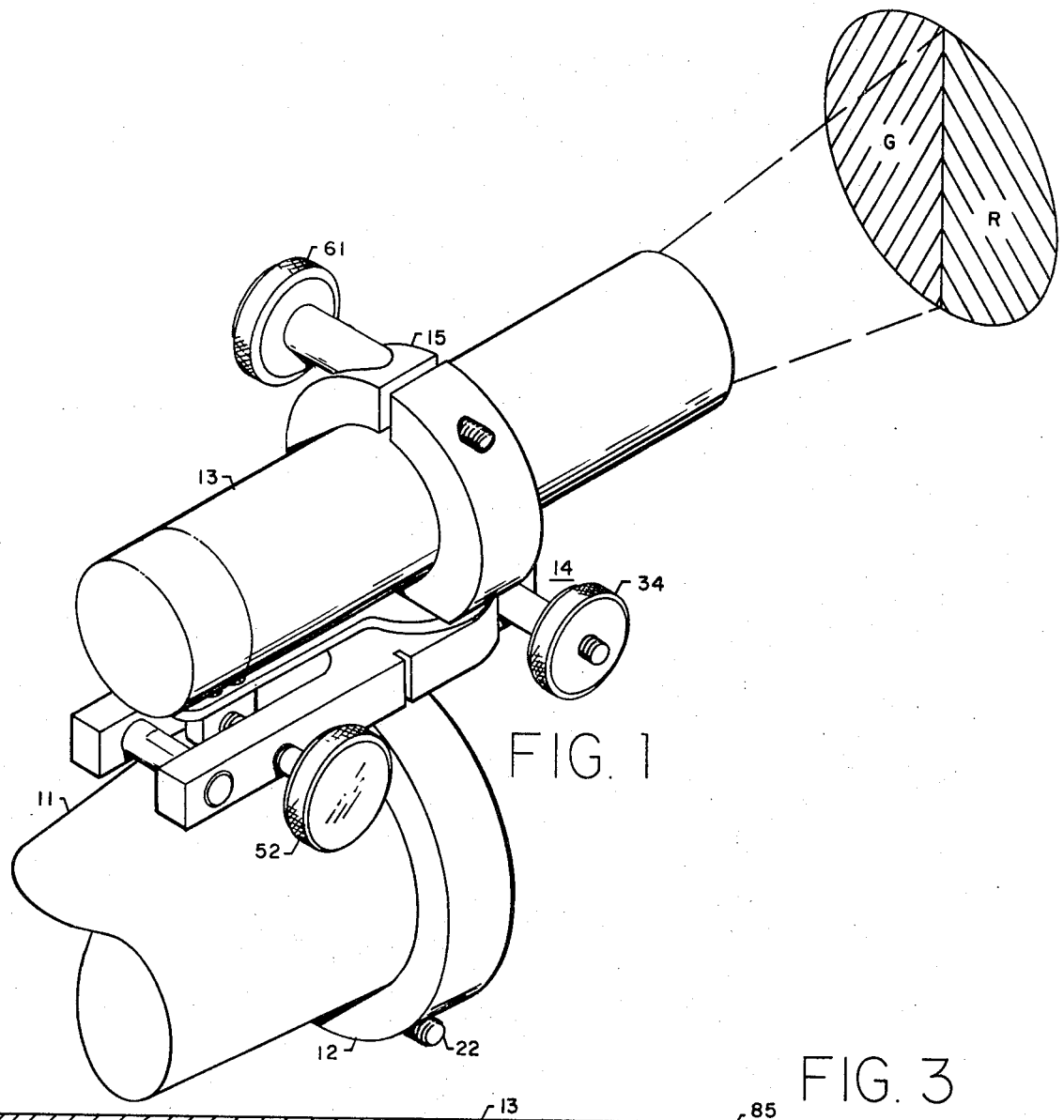
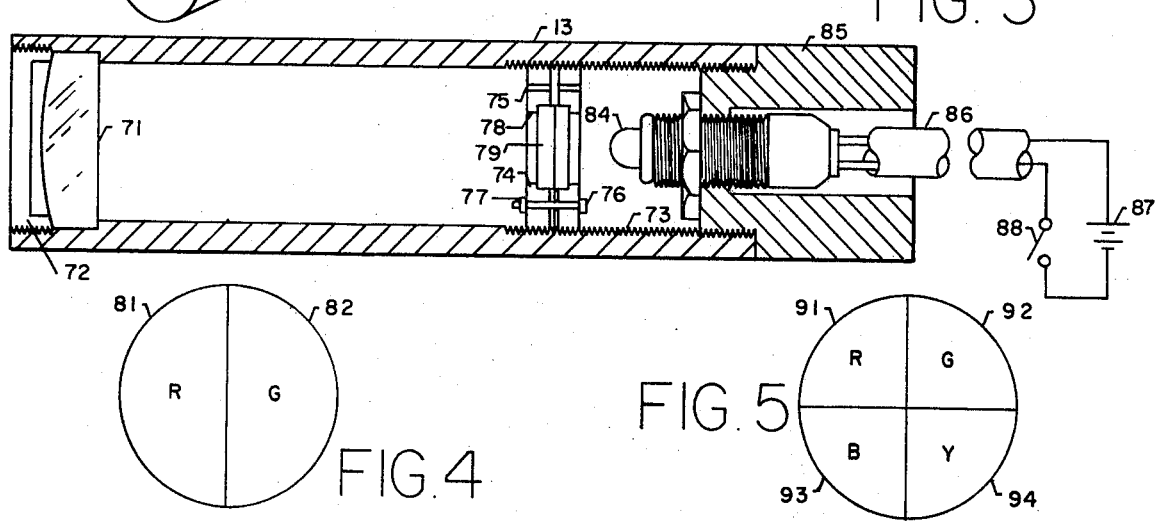

ALIGNMENT INDICATING BEACON

This is a continuation, of application Ser. No. 312,537 now abandoned, filed Dec. 6, 1972.

BACKGROUND OF THE INVENTION

1. Field of the Invention

This invention relates generally to beacons and particularly to beacons which transmit energy into space in such a way as to enable an observer to determine his position relative to a known reference direction.

2. Description of the Prior Art

Many arrangements of the general kind mentioned above have been used in the past. For example, U.S. Pat. No. 3,662,180 describes an arrangement in which a series of coded patterns of light and dark areas are transmitted successively into space. An observer may determine his angular relation to a reference direction by noting the sequence and timing of the pulses of light he receives. Another example is the system described in the copending United States application of P. M. Johnson, R. M. Northrup and W. G. Dudevoir, Ser. No. 146,392 filed May 24, 1971, now U.S. Pat. No. 3,704,070 entitled "Direction Determining System" and assigned to the same assignee as is the instant application. The system of the cited application is similar to that of the patent except that it uses a separate light source for each of the coded patterns. Other systems have been used in which patterns comprising different colors of light are transmitted to identify the location of such things as safe navigation channels and proper aircraft glide paths.

The present invention is directed particularly to the recurring problem faced by a surveyor each time he needs to place himself on the line of sight of a transit. Such a problem arises, for example, when an axman is clearing brush to provide a line of sight. Typically, the instrument man sets up his transit over a known point and directs the telescope along the proper azimuth. The axman starts clearing the brush and as he gets farther away he looks back towards the transit and the instrument man tells him, by voice or hand signals, which way to move to get on line. This procedure becomes quite awkward at distances of more than a couple of hundred feet or so and in addition requires the continuous presence of the instrument man. It would be desirable to provide some system by which an axman, or rodman, or anyone else for that matter, could place himself on the line of sight of the transit without requiring another's assistance.

It is a general object of the present invention to provide an instrument which enables a person to determine for himself, without assistance, whether he is to one or the other side of the optical axis of a telescope.

Another object is to provide such an instrument which can be readily attached to and removed from the telescope of a surveyor's transit.

SUMMARY OF THE INVENTION

Briefly stated, an instrument incorporating the invention includes equipment for projecting into a region of space a pattern of energy which divides the region into two or more sharply defined portions, distinguished by the different characteristics of the energy projected into each. The instrument also includes a clamp by which it may be mounted on the smooth cylindrical surface normally provided on the end of a transit's telescope for retaining a lens cap or sun shade. Also including are mechanisms by which the line or lines of division between portions can be aligned with the optical axis of the telescope.

BRIEF DESCRIPTION OF THE DRAWING

For a clearer understanding of the invention reference may be made to the following detailed description and the accompanying drawing, in which:

FIG. 1 is a pictorial view, partly schematic, illustrating a preferred embodiment of the invention installed for use and the pattern projected thereby;

FIG. 3 is a cross section view of the housing showing the internal parts;

FIG. 4 is a schematic view showing one kind of reticle which may be used; and

FIG. 5 is a schematic view showing another form of reticle which may be used.

DESCRIPTION OF PREFERRED EMBODIMENT

Figure 2:
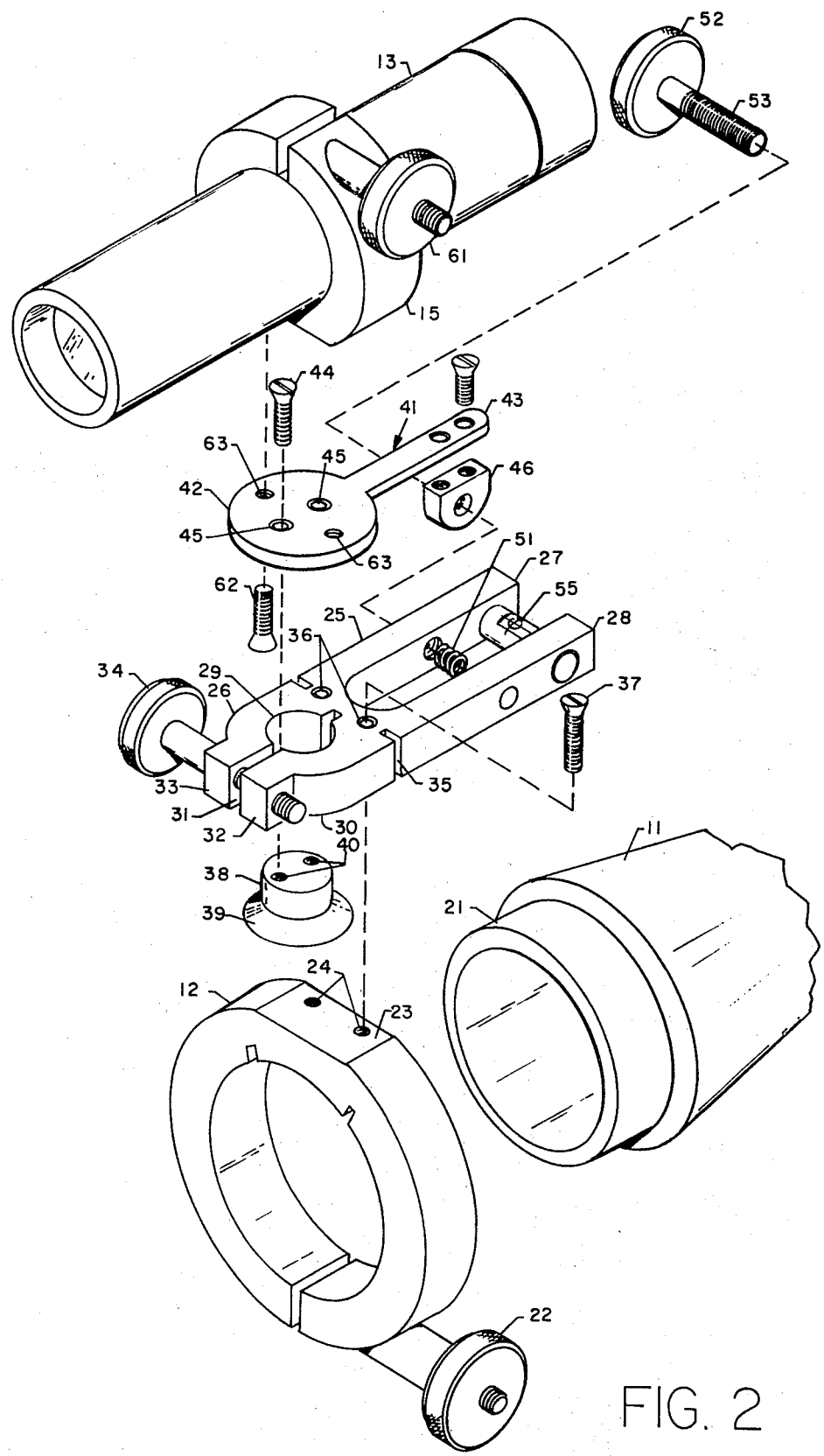
FIG. 2 is an exploded view of a preferred embodiment.

Referring now to FIG. 1 there is shown a generally cylindrical tube 11 which is the housing of the telescope of a surveyor's transit. The beacon of the invention is installed on the telescope 11 by a mounting mechanism which includes a clamp 12 which engages the outer surface of the tube 11 near the end thereof. The beacon itself includes a housing 13 which encloses equipment (to be more fully described) for directing energy about a projection axis toward the selected region of space. The housing 13 is preferably, but not necessarily, generally cylindrical in shape and is secured to the clamp 12 by means of a support mechanism indicated generally by the reference character 14 and which will be more fully described subsequently. More particularly, the housing 13 is carried by a mechanism including a clamp 15 which frictionally engages the outer cylindrical surface of the housing 13 in such a way that the housing may be rotated about its own axis so as to select the proper angular orientation whereupon it may be clamped in place. The entire mounting mechanism will be described more fully in connection with FIG. 2 but for present purposes it is sufficient to note that the entire assembly may be rotated about the axis of the tube 11 and clamped in place; that the housing 13 may be adjusted to any position about its own axis and clamped in place by means of the clamp 15; and that the clamp 15 is mounted to the clamp 12 for limited rotation about a pivot axis which is perpendicular to and intersects both the axis of the tube 11 and the axis of the housing 13. In the simplest case the transit is set up with the axis of the telescope (and the axis of the tube 11) horizontal and the housing 13 is positioned directly above with its axis, which is substantially coincident with the projection axis, also horizontal. The position of the housing 13 about the pivot axis, which is now vertical, is adjusted until the projection axis is substantially aligned with the axis of the tube 11. The pattern of light is directed along the projection axis which is approximately along the line of sight of the telescope. As illustrated in FIG. 1, this pattern may comprise simply red light to one side of the vertical center line and green light to the other side. With this arrangement an observer within the field of view need only observe the color light he is receiving to determine for himself, without assistance, whether he is to one or the other side of the line of sight of the transit.

Referring now to FIG. 2, the housing 11 of the telescope is shown as including a smooth, machined, cylindrical surface 21 on the forward end thereof. The telescope of most transits is provided with such a surface for the purpose of holding a sunshade and/or a lens cap. The clamp 12 is a cylindrical split ring clamp of the proper size to cooperate with the surface 21. The clamp 12 includes a thumb screw 22 threaded into one portion of the clamp and bearing against the other portion so that it may be selectively loosened or tightened. The upper surface of the clamp 22 is formed with a flattened surface 23 and two internally threaded holes 24.

Above the clamp 12 there is shown a generally fork shaped member 25 having a stem portion 26 and two tines 27 and 28 extending therefrom. The stem portion 26 is formed with a generally cylindrical aperture 29 therethrough having a bevel 30 on the bottom. The portion 26 is also formed with a slot 31 extending from the aperture 29, at a point opposite the tines 27 and 28, to the outer edge. Adjacent to the slot 31 and on opposite sides thereof the stem portion 26 is formed with protuberances 32 and 33. A thumb screw 34 is threaded into the protuberance 32 and bears against the protuberance 33 with the result that the step portion 26 is, in effect, another cylindrical split ring clamp. The stem portion 26 is also formed with several small stress relieving slots such as the slot 35, and with two small holes 36. When the apparatus is assembled, the fork 25 is fastened to the clamp 12 by means of machine screws 37 extending through the holes 36 and threaded into the holes 24 in the clamp 12. In this position, the axis of the cylindrical aperture 29 is perpendicular to and intersects the axis (or axis extended) of the cylindrical clamp 12 which is coaxial with the axis of the tube 11.

A generally cylindrical bushing 38 has an outer diameter of proper size to make a smooth sliding fit within the aperture 29. The bushing 38 is formed with a beveled flange 39 which cooperates with the beveled portion 30 formed at the lower edge of the aperture 29. The bushing 38 is also formed with two small threaded holes 40. When assembled, the bushing 38 fits into the aperture 29 with the bottom thereof substantially flush with the bottom of the fork member 25.

A tang indicated generally by the reference character 41 includes a generally circular portion 42 having a diameter slightly larger than the diameter of the aperture 29. The tang 41 also includes a portion 43 extending from the generally cylindrical portion 42. When the equipment is assembled, the tang 41 is fastened to the bushing 38 by means of machine screws 44 extending through holes 45 in the circular portion 42 and threaded into the threaded holes 40 in the bushing 38. When so assembled, the tank 41 lies just above the fork member 25 with the circular portion 42 above them. The extending portion 43 is provided with a downwardly extending tab 46 which thus projects between the tines 27 and 28.

A small spring 51 is mounted on the inner surface of the tine 28 so as to project inwardly and engage the tab 46 of the tang 41 so as to urge the tang 41 to rotate in a counter clockwise direction as viewed from above in FIG. 2. Opposite the spring 51 is a thumb screw 52 having a projecting portion 53 which extends between the tines 27 and 28 and engages the tab 46 on the opposite side from that by which it is engaged by the spring 51 thereby restraining rotation of the tab 51 and allowing its angular position to be adjusted.

Mounted between the tines 27 and 28 near the end thereof is a spirit level 55 positioned to indicate the verticality of the axis of the aperture 29 in the stem portion 26 as the instrument is rotated about the axis of the clamp 12.

The clamp 15 is a cylindrical split ring clamp similar to clamp 12 and also includes a thumb screw 61 bearing against one portion of the ring and threaded into the other portion so that the clamp may be selectively loosened or tightened around the housing 13. The bottom of the clamp is formed with a flattened portion and with two small internally threaded holes. When the apparatus is assembled, the clamp 15 is fastened onto the generally circular portion 42 of the tang 41 by means of a pair of screws 62 which pass through apertures 63 and are threaded into the holes in the clamp 15.

Referring now to FIG. 3, a projection lens 71 is mounted within and near one end of the housing 13 and is held in place by a threaded retaining ring 72. The interior surface of the housing 13 is formed with screw threads 73 along a portion of its length which includes the focal plane of the lens 71. A generally cylindrical reticle holder 74 comprises two identical parts positioned back to back as shown, only one part of which is indicated by a reference character. Both portions are formed with several small holes 75, for example four, extending completely therethrough, and parallel to the axis of the reticle holder 74. Two of these are used to fasten the parts together by means of screws 76 and nuts 77, while the other holes are left empty for a purpose which will appear. Both portions are also formed with a central bore 78 extending completely therethrough. Both bores are enlarged on one side to form shoulders which are positioned back to back and between which are held a reticle 79. The reticle 79 comprises two identical generally cylindrical glass portions, only one of which is denoted by a reference character in FIG. 3. A red filter 81 and a green filter 82 are positioned between and held by the two portions 79. As best shown in FIG. 4, the filters 81 and 82 are each formed with one straight edge. The filters are positioned with their two straight edges touching each other and lying substantially along a diameter of the bore 78, which is also a diameter of the housing 13.

A lamp 84 is mounted within and near the right end of the housing 13 so as to illuminate the reticle 79. The lamp is held by any suitable housing such as the lamp housing 85 which also cooperates with the threads 73. A cable 86 connects the lamp 84 to a battery 87 through a switch 88.

Initially, the reticle 79 should be positioned in the focal plane of the lens 71. This may be done by first removing the lamp 84 and its housing 85 so that the reticle 79 may be viewed and so that a thin rod may be inserted through the now open end of the housing 13 onto one of the small holes 75. The axis of the housing 13 may now be directed toward a brightly illuminated object one or two hundred feet away so that an image thereof is formed by the lens 71 on the reticle 79. While the image is being viewed either by the naked eye or with the aid of an eyepiece, the reticle 79 is rotated by the rod until the image is focused clearly. The line of division between the filters may be at any angular position at this time but is adjusted during alignment, as explained below. If the threads are fine enough and tight enough, the inherent friction may be sufficient to hold the reticle in place but is is preferred to fasten it in some manner as by a drop of cement joining the body of the reticle holder 74 to the threads 73 or by a threaded retaining ring (not shown) similar to the ring 72 and tightened against the right side of the reticle holder 74 so as to lock it into place. The lamp 84 and the holder 85 may then be installed.

When the device is to be used, it is first mounted in a position approximately as shown in FIG. 1 on the tube 11 of the telescope of the transit. Then the transit is set up over the desired point, the head leveled, and the axis of the telescope and the tube 11 made horizontal. Next the mounting clamp 12 is loosened by means of the thumb screw 22 and the entire assembly rotated about the tube 11 until the spirit level 55 indicates that the pivot axis is vertical whereupon the thumb screw 22 is tightened. Next a reflector is mounted on some suitable support such as a tree 100 or 200 feet away and the lamp 84 is turned on. The telescope may be elevated or depressed and rotated in a azimuth as necessary to sight the reflector. Next the clamp knob 34 is loosened so as to allow rotation of the tang 41 about the nominally vertical pivot axis. Next, while sighting through the telescope to the reflector, the horizontal adjusting knob 52, that is, the thumb screw 52, is turned until the line of division between the red and green portions of the field is in alignment with the vertical cross hair of the telescope whereupon the horizontal clamp knob 34 is tightened. Next, the housing clamp knob 61 is loosened and the housing 13 is rotated about its axis to make the red-green dividing line truly vertical as can be seen by comparison with the vertical cross hair of the transit. Such adjustment may require readjustment of the horizontal adjusting knob 52.

Once the instrument is set up as above indicated, an observer anywhere in the field can determine for himself to which side of the center line the telescope he is on by simply observing the color of the light he is receiving. It is not necessary that the telescope remain horizontal. It can be elevated or depressed as necessary to accommodate the general level of the terrain. It is to be noted that once the instrument is installed on a transit and aligned as above indicated, that it can be removed and reinstalled quite simply without a great deal of alignment procedure. The instrument can be removed from the telecscope by loosening the mounting clamp 22 and it can be installed with a minimum of readjustment. It is only necessary to set up the transit with its telescope level, reinstall the instrument and adjust its angular position while observing the spirit level 55 so as to make the pivot axis vertical and then tighten the knob 22. Once this is done, it is no longer necessary to keep the telescope level, and the pivot axis, although no longer vertical, will be perpendicular to and intersect both the axis of the clamp 12 (and tube 11) and the axis of the clamp 15 (and housing 13).

An important feature of the invention is that it takes advantage of the smooth surface 21 found on the end of most telescopes. This insures the repeatability of the alignment and allows the instrument to be removed and reinstalled on the same transit, in the manner noted above, by requiring only the simple adjustment of the clamp 12. Strictly speaking, the level bubble is not necessary since once aligned, corresponding marks could be placed on the housing 11 and the clamp 12. However, the level bubble is preferred at present because this appears to be the simplest and easiest method of alignment and also makes it simple to mount the instrument on any transit.

The nominally vertical pivot axis (the axis of the aperture 29) has been described as being perpendicular to and intersecting both the axis of the clamp 12 and the axis of the housing 13 and it is preferred that this be so, within normal manufacturing tolerances. However, this is not strictly necessary. The pivot axis may be adjusted in one dimension by rotation of the clamp 12 and made to lie in that vertical plane which contains the axis of the clamp 12 (and the tube 11). No provision is made for further adjustment because exact verticality within this plane is not important. As long as we are interested only in dividing the sector of space along a vertical plane through the axis of the telescope, the pivot axis may depart from verticality (provided it stays within the aforesaid plane) and need not be perpendicular to either or both of the axes of the clamp 12 and 15. In other words, the axis of the tube 13 may be either depressed or elevated with respect to the axis of the tube 11 without affecting operation adversely. However, it is preferred at present that the axes of clamps 12 and 15 be parallel to each other and that both are perpendicular to and intersected by the pivot axis, within the limits of error afforded by the construction shown.

As so far described, it has been assumed that the observer wishes to tell whether he is to one or the other side of a vertical plane. The invention may also be used to determine orientation with respect to a horizontal plane of with respect to an inclined plane. This could be done simply by making the division between the red and green filters horizontal instead of vertical. The instrument could remain mounted above the telescope, as described above, or alternatively the entire instrument could be clamped to one side of the tube 13 so that the horizontal division between the red and green filters is aligned with the horizontal cross hair of the telescope. In either case, the telescope need not be maintained horizontal but can be depressed or elevated so as to define as inclined plane.

Another variation is to use a reticle including four filters, each of a different color as illustrated in FIG. 5. In this embodiment, there are four filters 91, 92, 93 and 94 each of a different color, for example, red, green, blue and yellow, and each formed with two straight edges meeting at an included right angle. The filters are mounted and positioned with the junction of the two straight edges of each meeting at a common point substantially in the center of the aperture in the holder so as to divide the aperture into four equal circular sectors. By this arrangement, different colors of light are projected into each of the four equal sectors surrounding the center line of the instrument and an observer can determine, without assistance, which sector he is in.

In a preferred embodiment described, the housing 13 is cylindrical and may be rotated about its axis and held in any orientation by the clamp 15. This arrangement, although preferred is not absolutely necessary. It has been found that the depth of focus of the lens 71 is sufficient to allow the reticle 79 to be rotated a full turn from its optimum position without causing serious defocusing. This means that the housing 13 may have a predetermined, fixed angular orientation about its axis with respect to the remainder of the instrument and may be fastened to the tang 41 without provision for angular adjustment. Indeed, the surface of the housing 13 need not be circular in cross section but may be of some other shape, such as square. In any such case, when the reticle is focused, it will be turned to make the line of division between filters have the proper angular position with respect to the installed orientation of the housing 13 even if this requires a minor defocusing of the reticle. However, the form of construction illustrated and described is preferred at present.

Although a preferred embodiment of the invention has been described in considerable detail for illustrative purposes, many modifications will occur to those skilled in the art. It is therefore desired that the protection afforded by Letters Patent be limited only by the true scope of the appended claims.

What is claimed is:

1. A beacon, particularly suitable for use with a surveying instrument, for projecting into a region of space a pattern of radiant energy having different, distinguishable characteristics in different portions of said region and including mounting means for installing said beacon so that it can be positioned and oriented to project said pattern into a selected region of space, characterized in that said beacon includes a housing enclosing equipment for directing radiant energy about a projection axis toward said region, and in that said mounting means includes a clamp for engaging a tube, said clamp including means for selectively permitting or preventing rotation of said clamp around said tube, and in that said mounting means also includes support means for mounting said housing on said clamp for rotation about a pivot axis which intersects said projection axis and the axis of said tube.

2. A beacon in accordance with claim 1 in which said support means includes means for adjusting the angular position of said housing about said pivot axis.

3. A beacon in accordance with claim 1 in which the pivot axis of said support means is perpendicular to both said projection axis and the axis of said tube.

4. A beacon in accordance with claim 1 in which said support means includes an additional clamp for engaging the outer surface of said housing.

5. A beacon in accordance with claim 4 in which said support means includes a generally fork shaped member having a stem portion and two tines extending therefrom, said stem portion being formed with a cylindrical aperture therethrough, the axis of which is said pivot axis, said member being fastened to said generally cylindrical clamp with the axis of said aperture perpendicular to and intersecting the axis of said generally cylindrical clamp, a generally cylindrical bushing located within said aperture and making a sliding fit therewith, a tang including a generally circular portion and an extending portion, said generally circular portion being fastened to said bushing and to said additional clamp, and means cooperating with said tines and said extending portion for adjusting the angular position of said tang with respect to said member.

6. A beacon in accordance with claim 5 in which said means for adjusting includes a spring acting between one of said tines and said extending portion for urging said tang to rotate about said pivot axis and which also includes a thumb screw cooperating with the other of said tines for adjustably restraining rotation of said tang.

7. A beacon in accordance with claim 5 including a spirit level mounted between said tines in such positions as to indicate verticality of said pivot axis of said generally cylindrical clamp is rotated about said tube.

8. A beacon in accordance with claim 1 in which said housing is generally cylindrical in shape.

9. A beacon in accordance with claim 8 in which said support means includes carrying means by which the angular orientation of said housing about its cylindrical axis may be selected.

10. A beacon in accordance with claim 9 in which said carrying means includes an additional clamp for engaging the outer surface of said housing and having means for selectively preventing or permitting rotation of said housing about its axis.

11. A beacon in accordance with claim 10 including a projection lens mounted within said housing near one end thereof, said housing being formed with internal threads along a portion of the interior surface thereof including the focal plane of said lens, a generally cylindrical reticle holder formed with external threads engaging said internal threads of said housing, said holder being formed with a circular axial aperture, and a reticle mounted in said reticle holder.

12. A beacon in accordance with claim 11 including a source of radiant energy mounted within said housing in such a location as to illuminate said reticle.

13. A beacon in accordance with claim 12 in which said source of radiant energy is a source of visible light.

14. A beacon in accordance with claim 13 in which said reticle comprises a plurality of different colored filters positioned to divide said aperture into a like number of circular segments.

15. A beacon in accordance with claim 14 in which said reticle comprises two filters each of a different color and each having a straight edge and positioned in said reticle holder with said edges touching and lying substantially along a diameter of said housing so that each covers substantially one-half of said aperture in said holder.

16. A beacon in accordance with claim 14 in which said reticle comprises four filters each of a different color and each formed with two straight edges meeting at an inclined right angle, said reticles being mounted and positioned with the junction of said tow straight edges of each meeting at a common point substantially at the center of said aperture in said holder.

17. A beacon in accordance with claim 1 in which said tube is generally cylindrical and in which said clamp is a generally cylindrical clamp for engaging the outer surface of said tube so that said clamp and said tube are coaxial.

* * * * *